(12) United States Patent
Lai

(10) Patent No.: US 9,979,270 B2
(45) Date of Patent: May 22, 2018

(54) CONTROLLABLE DRIVER AND DRIVE METHOD

(71) Applicant: PHILIPS LIGHTING HOLDING B.V., Eindhoven (NL)

(72) Inventor: Bing Lai, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/535,132

(22) PCT Filed: Dec. 11, 2015

(86) PCT No.: PCT/EP2015/079494
§ 371 (c)(1),
(2) Date: Jun. 12, 2017

(87) PCT Pub. No.: WO2016/107728
PCT Pub. Date: Jul. 7, 2016

(65) Prior Publication Data
US 2017/0353097 A1 Dec. 7, 2017

(30) Foreign Application Priority Data

Dec. 31, 2014 (WO) ................ PCT/CN2014/095947
Mar. 18, 2015 (EP) ..................... 15159625

(51) Int. Cl.
*H05B 37/02* (2006.01)
*H05B 39/04* (2006.01)
(Continued)

(52) U.S. Cl.
CPC ......... *H02M 1/08* (2013.01); *H02M 3/33523* (2013.01); *H05B 33/0815* (2013.01);
(Continued)

(58) Field of Classification Search
CPC .............. H05B 33/089; H05B 33/0815; H05B 33/083; H05B 33/0845; H05B 33/0851; H05B 33/0887; H05B 37/02
(Continued)

(56) References Cited

U.S. PATENT DOCUMENTS 5,751,118 A    5/1998 Mortimer
8,198,874 B2   6/2012 Melanson
(Continued)

FOREIGN PATENT DOCUMENTS

WO    9524819 A1    9/1995
WO    2013014607 A1    1/2013

*Primary Examiner* — Alexander H Taningco
*Assistant Examiner* — Christian L Garcia

(57) ABSTRACT

A controllable driver (1) is provided for driving a load. The controllable driver (1) comprises a primary converter (11) and a control circuit (13) isolated from one another by an opto-isolator (18). The controllable driver (11) is isolated from an output load (19) by a magnetically coupled pair of windings (112, 114); wherein said windings are adapted to provide a voltage supply to said output load. A feedback signal from the output load, indicative of a load current flowing in the second winding, is provided to the control circuit by a winding (12) isolated from the first and second windings (112, 114), such that the control circuit (13) remains isolated from the output load. The control circuit also directly receive input control signal without an opto-isolator. The control circuit is also isolated from the switching core (111) of the primary converter (11) via an opto-isolator. Such a controllable driver reduces the likelihood and impact of electromagnetic interference test failures and potential energy surges.

15 Claims, 6 Drawing Sheets

(51) Int. Cl.
  *H05B 41/36*     (2006.01)
  *H02M 1/08*      (2006.01)
  *H02M 3/335*     (2006.01)
  *H05B 33/08*     (2006.01)

(52) U.S. Cl.
  CPC ..... *H05B 33/0851* (2013.01); *H02M 3/33553* (2013.01); *H05B 33/083* (2013.01); *H05B 33/089* (2013.01); *H05B 33/0845* (2013.01); *H05B 33/0887* (2013.01); *H05B 37/02* (2013.01)

(58) Field of Classification Search
  USPC ....... 315/121, 122, 127, 123, 291, 297, 201, 315/304, 119, 185 R, 128; 307/157
  See application file for complete search history.

(56) References Cited

U.S. PATENT DOCUMENTS

| | | |
|---|---|---|
| 2009/0184662 A1 | 7/2009 | Given et al. |
| 2011/0080102 A1 | 4/2011 | Ge et al. |
| 2012/0104956 A1 | 5/2012 | Yang et al. |
| 2013/0300310 A1 | 11/2013 | Hu |
| 2014/0167634 A1 | 6/2014 | Ivankovic et al. |

CONTROLLABLE DRIVER AND DRIVE METHOD

CROSS-REFERENCE TO PRIOR APPLICATIONS

This application is the U.S. National Phase application under 35 U.S.C. § 371 of International Application No. PCT/EP2015/079494, filed on Dec. 11, 2015 which claims the benefit of Chinese Patent Application No. PCT/CN2014/095947, filed on Dec. 31, 2014, filed on Dec. 31, 2014 and European Patent Application No. 15159625.1, filed on Mar. 18, 2015. These applications are hereby incorporated by reference herein.

FIELD OF THE INVENTION

This invention relates to the field of load drivers, and more particularly to load drivers able to provide a controllable input supply for the load.

BACKGROUND OF THE INVENTION

Controllable drivers may be used to vary the voltage supply provided to a load. One known use of such controllable drivers is to controllably dim an LED output load. In such drivers, there is typically a primary converter adapted to receive and convert an input supply in response to at least one desired supply signal from control circuitry. The said control circuitry typically generates the at least one desired supply signal from at least one input control signal. The primary converter and the output load are usually isolated from one another by a pair of magnetically coupled windings.

It is known to isolate the control circuitry, which generates at least one desired supply signal, from the primary converter with an opto-isolator. However, an opto-isolator to transfer the desired supply signal may be expensive. It is also known to provide a feedback signal from the output load to the primary converter or the control circuitry. Providing such a feedback signal allows an error signal, corresponding to the difference between desired and current supply levels, to be generated. However, the use of a feedback signal adds the possibility of electromagnetic interference test failures and potential energy surges.

FIG. 6 shows an exemplary prior art topology of a known driver 6. The controllable driver 6 comprises the primary converter 61, the control circuitry 62 and an opto-isolator 64.

The primary converter 61 receives and converts an input supply $V_{sup}$ using a power generator 611 to generate a supply signal $V_{load}$ for provision to a load 69. The primary converter 61 and the output load 69 are electrically isolated from another by a first winding 612 and a second winding 614, magnetically coupled together by a shared magnetic core 613. The level of the supply signal $V_{load}$ is adjustable by the power generator 611 in response to an error signal, also called an adjustment signal, $V_{ad}$. This adjustment signal is provided to the primary converter 61 by the control circuitry 62 via the opto-isolator 64. Comparator circuitry of the control circuitry 62 is used to generate the said adjustment signal $V_{ad}$ in response to a comparison performed between a desired voltage signal generated by a dimming interface and a feedback signal $V_{fb}$, directly connected to the comparator circuitry from the second winding 614 (i.e. from the isolated supply signal supplied to the load). An interface 63 generates the said desired voltage signal in response to at least one input control signal $V_{in}$.

The driver 6, therefore, delivers a controllable voltage supply signal ($V_{load}$) to the load 69, whilst ensuring isolation of the said load 69 from the primary converter 61. The control circuitry 62 used to control the voltage supply $V_{load}$ is also isolated from the primary converter 61.

US20140167634A1 discloses a LED driver includes a transformer, current control loop and current adjustment circuit. The current adjustment circuit connects to either of the primary side or the secondary side directly, and uses an opto-coupler to access an PWM dimming signal.

SUMMARY OF THE INVENTION

It would be advantageous to have a low cost controllable driver and drive method. Specifically, it would be advantageous to have a controllable driver wherein the control circuitry is isolated from both the primary converter and an output load.

To address at least one of these concerns, the invention is defined by the claims.

According to examples in accordance with an aspect of the invention, there is provided a controllable driver for driving a load, comprising: a primary converter, adapted to receive an input supply and an adjustment signal, and to generate a converted input supply, said primary converter comprising a first and second magnetically coupled windings, wherein the first winding and the second winding are adapted to deliver the converted input supply to a load; a third winding isolated from the first and second windings, wherein a feedback signal is induced by the converted input supply to the third winding, said feedback signal being indicative of a load current flowing in the second winding; a control circuit connected to the third winding, wherein said control circuit is adapted: to receive the feedback signal from the third winding; to receive at least one input control signal directly without an opto-isolator; and to generate the adjustment signal based on the feedback signal and one or more of the at least one input control signals; and an opto-isolator, connected between a switching core of the primary converter and the control circuit, wherein said opto-isolator is adapted to pass the adjustment signal from the control circuit to the primary converter.

The opto-isolator may for example comprise a known opto-coupler. The control circuit may for example comprise a dimming interface such that the controllable driver is adapted to controllably dim an LED output load.

The first and second windings and the opto-isolator enable the control circuit, an output load and the primary converter to be isolated from one another. Use of an opto-isolator to communicate from the control circuit to the primary converter helps prevent leakage inductance of a transformer, thus improving linearity and variability of the controllable driver.

Isolating the output from the control circuit, through use of the third winding may prevent electromagnetic interference test failures and potential energy surges.

The primary converter is adapted to be controllable by the adjustment signal, such that the voltage supplied to the output load, via the first transformer, alters depending on the error signal.

The control circuit may be considered to generate a desired output signal from one or more of the at least one input control signals. A feedback or reference voltage may be measured from the output load by the third winding of the second transformer as a sensed load current signal. The control circuit may then further compare the desired output signal to the sensed load current signal in order to generate the adjustment signal.

The opto-isolator required to transmit such an adjustment signal would be relatively simple and cheap when compared to an opto-isolator used in a conventional driver structure. Because such an adjustment signal is often an error signal to tune the converter, not a value that would be detected to obtain its absolute amplitude.

The primary converter may comprise a power factor correction unit for correcting the power factor of the input supply, thereby generating a corrected input supply; a half bridge for inverting the corrected input supply into an AC wave; and a transformer for delivering said corrected input supply in AC wave to the load, comprising the first winding and the second winding.

This embodiment provides an implementation for the primary converter. In other words, the primary converter may improve the power factor of an AC signal by first converting it into the DC domain using, for example, a diode bridge and a consequent boost converter to improve the power factor. This DC domain signal may be converted back into the AC domain using a high-frequency half bridge power converter which may, for example, use a known LCC or LLC configuration. The first and second winding may be configured in a transformer arrangement, said transformer arrangement having a magnetic core. Such a transformer may allow for delivery of the corrected input supply to the output load whilst isolated the output load from the primary converter.

In the prior art US20140167634A1, the current adjustment circuit 110 is either belonging to the secondary side or to the primary side, and access the PWM dimming signal via an opto-coupler. In order to isolate the remote PWM controller with the powered secondary side or the primary side, a very accurate and in turn expensive opto-coupler is a must to accurately transfer the PWM to the current adjustment circuit 110.

In order to reduce the cost, the above aspect of the invention sets an additional control portion that is isolated from both first winding side and second side, thus this portion can directly access the input control signal without (expensive) opto-isolator since this portion has already be isolated from both power sides. No where in the prior art US20140167634A1 teaches or suggest setting the control part as a totally isolated part from both the primary side and the secondary side and it does not suggest removing the opto-coupler for the PWM dimming signal.

The controllable driver may comprise a power factor correction unit for correcting the power factor of the input supply, wherein said power factor correction unit comprises the first winding and the second winding; and the switching core adapted to switch a power flow from the voltage supply into said first winding.

This embodiment provides another implementation for the primary converter. The primary converter may alternatively comprise a power factor correction unit with integrated isolation for delivery of the converted input supply to the load. Such a primary converter may, for example, comprise a flyback converter or a buck-boost converter.

In one embodiment, the third winding is for example magnetically coupled to one of the first winding or the second winding.

In order to induce a feedback signal in the third winding, to provide an isolated feedback signal to the control circuitry, it may be preferable to couple the third winding to the first or second winding. In other words, the third winding may share a magnetic core with at least one of the first or second windings.

In an alternative embodiment, a fourth winding may be electrically connected to the second winding, and the third winding is then magnetically coupled to the fourth winding. This embodiment provides an alternative embodiment about how to induce the feedback signal from the secondary winding to the third winding.

A load current flowing in the second winding will cause a sensing current to flow in the electrically connected fourth winding. This sensing current flowing in the fourth winding will thereby induce a current to flow in the third winding to generate the feedback signal to be fed to the control circuitry.

In a further embodiment, the control circuit of the controllable driver may comprise at least one of the following: a PWM dimming interface adapted to receive one or more of the at least one input control signals in a form of pulse-width modulated signals; a 1-10V dimming interface adapted to receive one or more of the at least one input control signals in a form of voltage levels variable between 1-10V; and a current source dimming interface adapted for measuring a resistance of an external resistor.

The control circuit may be thus adapted to vary the strength of a desired output signal according to at least one pulse-width modulated signal received as input. The control circuit may otherwise or additionally comprise 1-10V dimming circuitry and thereby vary the strength of a desired output signal proportional to change of at least one input signal varying between 1-10V.

The control circuit may be advantageously adapted to receive input from at least one pulse-width modulated signal and at least one other signal, variable between 1-10V. The control circuit may be able to choose, or be selectable between, which one or more input signals to process in order to generate a desired output signal. Alternatively, the control circuit may generate a desired output signal based on all input signals.

The optional current source dimming interface may be used to probe an external resistor which provides information about a desired operating point for the driver for a particular lighting load. This may, for example, bias the desired output signal for driving different output loads.

The control circuit may comprise: a PWM dimming interface adapted to receive one or more of the at least one input control signal in a form of pulse-width modulated signals; a 1-10V dimming interface adapted to receive one or more of the at least one input control signal in a form of voltage levels variable between 1-10V; a current source dimming interface adapted for measuring a resistance of an external resistor; a common reference line connected to the PWM dimming interface, the 1-10V dimming interface and the current source dimming interface; and one of the following: a first common signal line connected to the PWM dimming interface, the 1-10V dimming interface and the current source dimming interface; a first common signal line connected to the PWM dimming interface and the current source dimming interface, and a second common signal line connected to the 1-10V dimming interface; or a first common signal line connected to the PWM dimming interface and a second common signal line connected to the 1-10V dimming interface and the current source interface.

In other words, the control circuit may comprise one universal interface block designed for PWM (pulse width modulated) dimming, 1-10V dimming and current source dimming. There may be provided to the control circuitry a plurality of input lines, each common to at least one interface. A reference line may be common to all three interfaces, and may be adapted to interchangeably serve as a ground/reference for at least one of the PWM dimming interface or the current source dimming interface, or provide a first input control signal for the 1-10V dimming interface, corresponding to a negative 1-10V dimming signal. A signal line may also be common to at least two of three interfaces, and may be adapted to interchangeably provide a first input control signal to the PWM dimming interface corresponding to a PWM dimming signal, a second input control signal to the 1-10V dimming interface corresponding to a positive 1-10V dimming signal or a current source dimming signal to the current source dimming interface.

Alternatively, the three possible signals previously provided by the signal line may be split, to be provided by a first signal line and a second signal line. In this instance, the first signal line may provide a signal to only the PWM dimming interface or to both the PWM interface and the current source dimming interface. Accordingly, the second signal line may respectively provide a signal to either both the 1-10V dimming interface and the current source dimming interface or only the 1-10V dimming interface.

The above embodiment of a universal interface block for different dimming protocol reduces the pin/line numbers and also decreases the interconnection complexity.

In one embodiment, the controllable driver may further comprise a fifth winding coupled to the first winding, wherein said fifth winding is connected to the dimming interfaces and is adapted to draw a first voltage supply from said first winding to the dimming interfaces.

Thus the fifth winding of the first transformer may be considered to be a low voltage supply for the control circuitry. This voltage supply of the control circuit may therefore be considered to draw power, but remain isolated, from the primary converter.

In one embodiment, the control circuit may further comprise an output line coupled to the fifth winding adapted to provide the first voltage supply as a PWM voltage reference output for connection to an external PWM controller.

An external PWM controller, required to provide the PWM signals, may need a PWM voltage reference signal to operate accurately. Therefore the control circuit may further comprise additional circuitry adapted to provide a PWM voltage reference signal and supply said signal on an output line.

In one embodiment, the controllable driver may be further adapted to comprise a secondary voltage supply unit between the fifth winding and the output line, adapted to convert the first voltage supply into a second voltage supply as the PWM voltage reference output.

A control circuit may require more than one voltage level in order to drive certain components, thus there may be a secondary voltage supply unit that converts a voltage from the first voltage supply (i.e. the fifth winding of the first transformer) to a lower or higher voltage. The secondary voltage supply unit may otherwise or additionally provide biasing to the adjustment signal in order that a more suitable voltage is provided to the opto-isolator.

In one embodiment, there may be optionally provided at least two ground terminals, wherein each ground terminal is for connection with a single, different, one of the following: the primary converter; the control circuit; and the output load.

To ensure the primary converter, the control circuit and the output load are fully isolated from one another, with the same benefits as previously detailed; it may be thus useful to apply a different, isolated, ground supply to at least two of the three.

The control circuitry may be adapted to comprise a 0-10V dimming interface, which may operate in the same manner as a 1-10V dimming interface; that is adapted to control the voltage output of the load in response to at least one input signal varying between 0 and 10V.

According to another aspect of the inventive concept, there is provided a lighting device comprising the controllable driver according to the abovementioned aspects and embodiments thereof.

According to another aspect of the inventive concept, there is provided a drive method for driving an LED output load, the method comprising: receiving an input supply and an adjustment signal at a primary converter, and generating a converted input supply; receiving the converted input supply of the primary converter at a first winding and providing a signal to an output load from a second winding coupled magnetically to the first winding; using a third winding such that a load current flowing in either the first or second winding induces a corresponding feedback signal in the third winding; receiving the feedback signal from the third winding at a control circuit, wherein said control circuit generates the adjustment signal based on the feedback signal and at least one input control signals; and passing the adjustment signal from the control circuit to the primary converter using an optical isolating coupling.

The method may be adapted to further comprise using a fourth winding electrically connected to the second winding, and magnetically coupled to one of the first or second windings, such that a load current following in either the first or second winding causes a current to flow in the fourth winding and thereby induces a corresponding feedback signal in the third winding.

The method optionally further comprises passing a first voltage supply to the control circuit using a fifth winding magnetically coupled to the first winding.

These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a controllable driver for driving a load. The controllable driver comprises: a primary converter, adapted to receive an input supply and an adjustment signal, and to generate a converted input supply, said primary converter comprising a first and second magnetically coupled windings, wherein the first winding and the second winding are adapted to deliver the converted input supply to a load; a third winding, wherein a feedback signal is induced by the converted input supply to the third winding; a control circuit connected to the third winding, wherein said control circuit is adapted: to receive the feedback signal from the third winding; to receive at least one input control signal; and to generate the adjustment signal based on the feedback signal and one or more of the at least one input control signals; and an opto-isolator, connected between the primary converter and the control circuit, wherein said opto-isolator is adapted to pass the adjustment signal from the control circuit to the primary converter.

Figure 1:
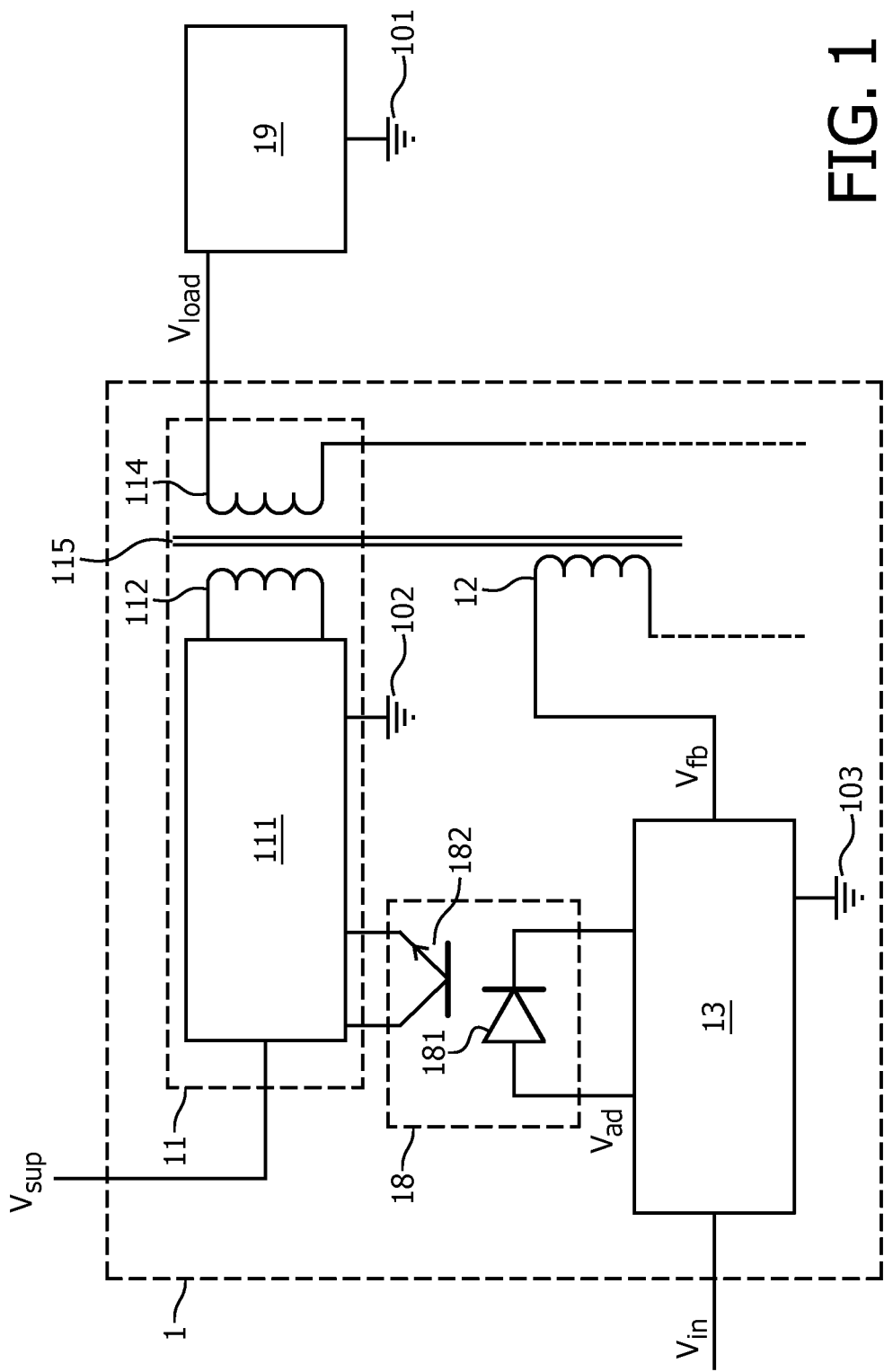
FIG. 1 illustrates a controllable driver according to a first exemplary embodiment.
Figure 2:
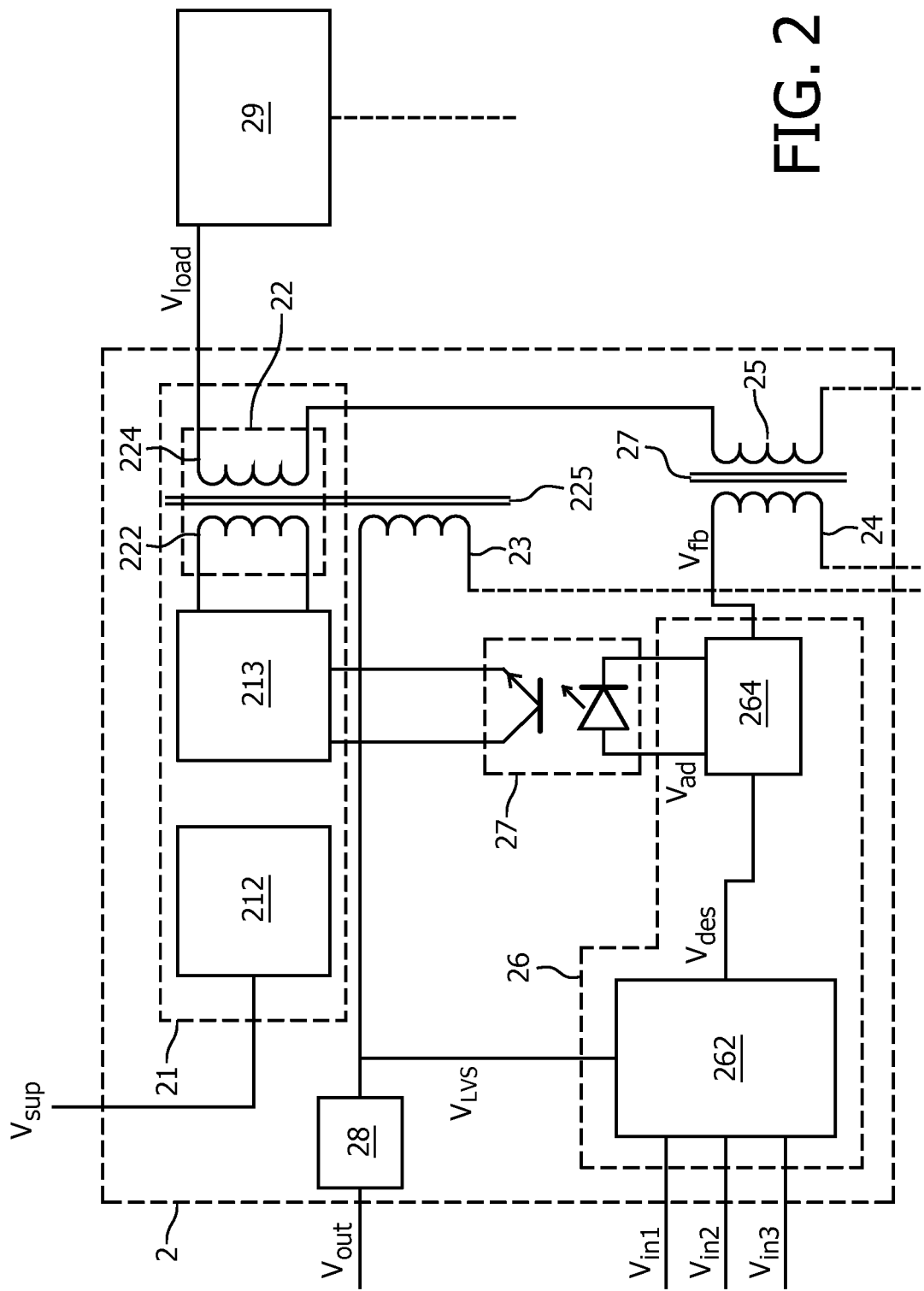
FIG. 2 illustrates a controllable driver according to a second exemplary embodiment.

FIG. 1 and FIG. 2 gives different embodiments for the primary converter as well as other components of the controllable driver. In a first embodiment, the first and second windings are used as part of power factor correction circuitry, with a function of power storing and releasing. In a second embodiment, the said first and second windings are used as an isolated power deliverer with a function of a voltage transformer.

Turning to FIG. 1, an exemplary embodiment of a controllable driver 1 is shown. A voltage supply ($V_{sup}$) is received by a primary convertor 11. The primary convertor 11 comprises a switching core 111 which may selectively switch the power flow from the voltage supply. The switched power flow is transferred to a load 19 as an output voltage $V_{load}$ by a pair of a first 112 and second 114 windings with a shared magnetic core 115. One possible implementation of the primary convertor 11 is a known isolated flyback converter, which may inherently comprise the first 112 and second 114 windings. In such a known flyback converter, the two windings may be reversely coupled such that the second winding 114 discharges when the switching core 111 permits power flow through the first winding 112. Thus electrical power can be made to transfer from one circuit to another, without direct electrical connection.

The primary convertor 11 generates the converted voltage supply ($V_{load}$) at least partially based upon an adjustment signal ($V_{ad}$) passed to the primary convertor from an opto-isolator 18. In an embodiment the adjustment signal may bias the converted voltage supply generated by the primary converter 11 to perform this adjustment.

The adjustment signal ($V_{ad}$) is generated by a control circuit 13 based upon an input control signal ($V_{in}$) and a feedback signal ($V_{fb}$). The feedback signal is generated by a third winding 12 wherein a current is induced by at least one of the first or second winding to the third winding 12. In this first embodiment, the third winding 12 is magnetically coupled to at least one of the first or second winding by, for example. sharing the same magnetic core 115 as the said windings. Thus the converted voltage supply may be dependent upon the difference between the feedback signal (i.e. the voltage supplied to the output) and a desired signal, generated from the at least one input control signals (e.g. $V_{in}$).

The opto-isolator 18 comprises a light emitting component 181 (e.g. an LED) and a photo-sensitive sensor 182 (e.g. a phototransistor), such that the said components are not electrically connected to one another.

The opto-isolator 18 therefore isolates the control circuit from the primary convertor; whilst the first and second winding isolate the primary convertor from the output load and the third winding isolates the control circuit from the output load. Therefore the primary convertor, output load and control circuit can be considered to be isolated from one another.

The input control signal ($V_{in}$) may be one of the following: a pulse width modulated signal; a voltage signal variable between 1-10V; a voltage signal variable between 0-10V; or a signal measured from an external resistor (not shown). Optionally, the input control signal may be selectable between at least two of the said preceding signals, and the circuit has the capability to process the at least two different signal types, as will be discussed below.

The control circuit 13 may comprise at least one dimming interface adapted to receive the input control signal and thereby generate a desired signal for comparison with the feedback signal. Such a dimming interface may comprise one of the following: a 1-10V dimming interface; a 0-10V dimming interface; a pulse-width modulated dimming interface; or a current source dimming interface adapted to interact with an external resistor.

An exemplary current source dimming interface may comprise a current source connected to an external resistor wherein the external resistor may bias the circuit. The current source may provide a current between 100 and 500 µA, more particularly between 150 and 300 µA, for example either 150 µA or 300 µA. The source may provide a voltage of approximately 5V.

The load 19, driven by the controllable driver 1, may comprise at least one LED, or, optionally, further drive circuitry connected to at least one LED. The load 19 can be considered to be isolated from both the control circuitry and the primary converter (and hence the power supply).

In some embodiments, there may be provided at least two of the following: a ground terminal 101 for connection to the load 19; a ground terminal 102 for connection to the primary converter 11; and a ground terminal 103 for connection to the control circuitry. Such different ground terminals allow for an isolated grounding reference to be provided to each of the isolated elements of the controllable driver.

FIG. 2 illustrates a second exemplary embodiment of a controllable driver 2, having three input control signals ($V_{in1}$, $V_{in2}$ and $V_{in3}$), a specific implementation of the input control signal $V_{in}$ of the first embodiment. The primary convertor 21 comprises a power factor correction unit 212, a half bridge inverter 213 and a transformer 22 comprising the first 222 and second 224 windings magnetically coupled by a first magnetic core 225. The power factor correction unit 212 first converts an AC (Alternating Current) supply signal, received from a mains supply, into the DC (Direct Current) domain using, for example, a diode bridge, and any converting unit that may adjust the power factor. Examples of such converting units include: a buck convertor; a boost converter; or even a linear converter. This DC domain signal is consequently passed to the half-bridge inverter 213, which converts the DC domain signal back into an AC signal for provision to the transformer 22.

As in a conventional understanding of an electrical transformer, an alternating current flows in the first winding 222 of the transformer 22 thereby producing a proportional, varying magnetic flux in a magnetic core 225. This varying magnetic flux, in turn, induces a proportional alternating current in the second winding 224. The transformer 22 transfers the signal from the half bridge inverter 213 to a load 29 through the first winding 222 and the second winding 224. The first and second windings may optionally form either a step-up or a step-down transformer to supply a voltage to the load proportional to that produced by the primary convertor. Optionally, the same magnitude of voltage supply as that produced by the primary converter is supplied to the load by ensuring, for example, that the first and second windings may have, for example, the same number of coils wrapped around the magnetic core.

Thus the primary converter generates a converted voltage supply ($V_{load}$) and supplies said converted voltage supply to the load 29.

The primary convertor 21 is controlled by an adjustment signal ($V_{ad}$) which is provided to the half bridge inverter 213 via opto-isolator 27 such that the DC-AC conversion performed by the half-bridge inverter 213 is at least partially influenced by the adjustment signal.

The opto-isolator 27 isolates the control circuit 26 (which performs the same function as the control circuit 13 in FIG. 1) from the primary convertor 21. As in the first embodiment, the opto-isolator 27 of the second embodiment comprises a light emitting component, for example an LED, and a photo-sensitive component, for example a photo-transistor.

The adjustment signal is generated by comparator circuitry 264 of the control circuit 26 in response a desired voltage signal ($V_{des}$) and a feedback signal ($V_{fb}$). The desired voltage signal is generated by a dimming interface block 262 in response to at least one input control signal. It will be understood that the desired voltage signal may alternatively comprise a group of signals corresponding to the desired voltage signal. In this second exemplary embodiment of FIG. 2, the at least one input control signal comprises a first, second and third input control signal ($V_{in1}$, $V_{in2}$, and $V_{in3}$ respectively). The dimming interface block 262, connected to the three input control signals, may comprise at least one of the following optional dimming interfaces: a PWM (pulse-width modulation) dimming interface, a 1-10V dimming interface or a current source dimming interface. Each dimming interface may alter the desired voltage signal ($V_{des}$) dependent upon at least one of the input signals.

Optionally, the dimming interface block comprises a plurality of the possible dimming interfaces (or indeed all three), and it is selectable which one or more dimming interfaces influences the generation of the desired voltage signal.

The nature of the three input signals may vary dependent upon the dimming interface in use. The said input signals may be common or supplied to one or more of the three interfaces. For example, the first input signal $V_{in1}$ may be provided as a reference line to all three interfaces and may be selectable between at least one of the following: a ground for the PWM dimming interface, a ground for the current source dimming interface or a first, e.g. negative (gray), voltage signal for the 1-10V dimming interface. Similarly, in an embodiment, the second input signal $V_{in2}$ may be provided on a signal line to all three interfaces and be selectable between at least one of the following: a signal for the PWM dimming interface; a signal from an external resistor for the current source dimming interface; or a second, e.g. positive, voltage signal for the 1-10V dimming interface. In a more detailed embodiment, the second signal line may be further split into a common signal line for two of the three interfaces and a signal line for the third interface. For example, the second common signal line $V_{in2}$ may be connected to the PWM dimming interface and the current source dimming interface and may provide a signal selectable between a signal for the PWM dimming interface and a positive signal for the current source dimming interface, and the third signal line $V_{in3}$ may be connected to the 1-10V dimming interface and may provide the positive (violet) signal for the 1-10V dimming interface. In one alternative example, the second signal line $V_{in2}$ may be connected to only the PWM dimming interface to provide the signal for the said PWM dimming interface and the third common signal line $V_{in3}$ may be connected to the both the current source dimming interface and the 1-10V dimming interface and may provide a signal selectable between a positive signal for the 1-10V dimming interface and the positive input signal for the current source interface.

It will be understood that the first voltage signal (i.e. the signal provided as a reference line) for the 1-10V dimming interface may alternatively be a positive voltage signal for the 1-10V dimming interface. Similarly the second voltage signal (i.e. the signal provided as a first or second signal line) for the 1-10V dimming interface may alternatively be a negative voltage signal for the 1-10V dimming interface.

Other variations on the provision of signals can be realized, including, but not limited to only providing one or more of the first, second or third input signals to only two dimming interfaces or providing one or more of the first, second or third input signals to a single dimming interface.

The aforementioned feedback signal ($V_{fb}$) is supplied to the control circuit 26, and in particular the unit 264, by a complimentary pair of a third 24 and fourth 25 winding magnetically coupled together. The said complimentary pair of windings is considered separate from the transformer 22. The two said windings are magnetically coupled by a second, separate, magnetic core 27. The fourth winding 25 is electrically connected to the second winding 224. Thus, as current flows in the second winding, caused by the passing of a load voltage from the primary convertor 21 to the load 29, a current is made to flow in the fourth winding 25. Due to the magnetic coupling of the third and fourth windings, a current is thereby induced in the third winding 24 proportional to the magnitude of the current flowing in the fourth winding 25. Hence, the magnitude of the converted power supply ($V_{load}$) may be sensed by the third winding 24 to supply a feedback signal ($V_{fb}$) for provision to the control circuit.

A low voltage supply ($V_{LVS}$) is supplied to the control circuit 26 and may, for example, be connected to at least the dimming interface block. Accordingly, the low voltage supply may be connected to at least one of the dimming interfaces. A fifth winding 23 is magnetically coupled, by the first magnetic core 225, to at least one of the first winding and the second winding to supply this low voltage supply. Thus the primary convertor may provide the power supply to the control circuit, and yet ensure the control circuit remains isolated. The low voltage supply may be a voltage between 5 and 15V, more particularly between 10 and 13V, for example 13V.

In a further embodiment, adapted to perform PWM dimming, the external PWM controller may require a reference voltage from the driver. To meet this need, the low voltage supply $V_{LVS}$ may also be provided as the reference voltage to the external PWM controller via an output line $V_{out}$. The supply $V_{LVS}$ may be directly sent directly via the output line $V_{out}$ if it meets the specification of the external PWM controller. In a still further embodiment, the low voltage supply is regulated by a secondary voltage supply 28 before being sent to the external PWM controller.

Figure 3:
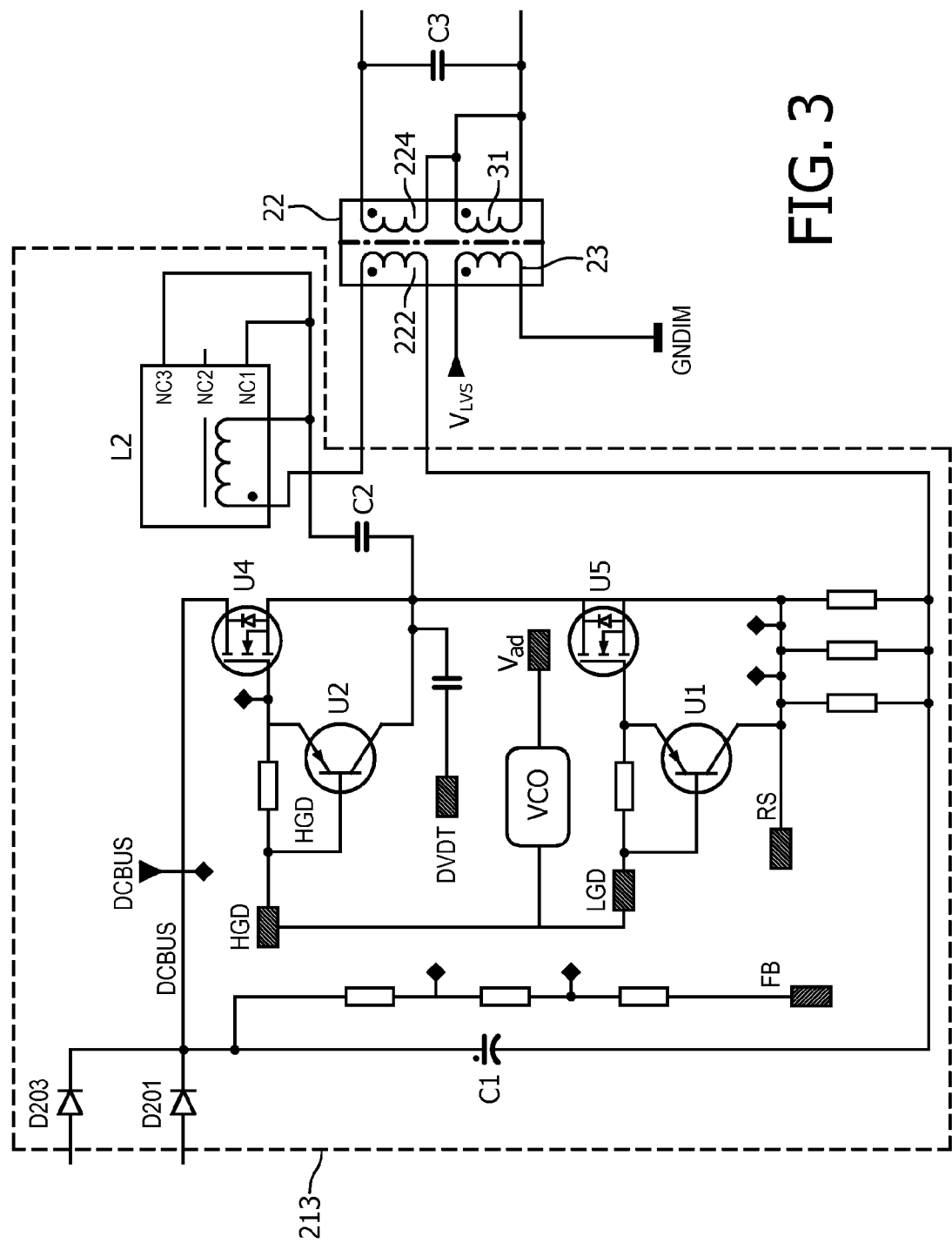
FIG. 3 displays an embodiment of a half bridge inverter and an embodiment of a transformer for a controllable driver according to the second embodiment.

A segment of the primary converter 21 for this second exemplary embodiment is displayed in FIG. 3. This section typifies an exemplary transformer 22 and half bridge inverter 213 of the second embodiment. The transformer 22, comprising the first 222 and second 224 windings, transfers the signal from the half bridge inverter 213. The transformer 22 also comprises the fifth winding 23, which induces a low power supply ($V_{LVS}$) for application to the control circuit. In this particular implementation, a further transformer winding 31 is present for transferring the signal from the half bridge inverter.

The half bridge inverter 213 comprises a first U2, U4 and second U1, U5 diode-switch pair which are arranged to be capable of producing an AC signal to be passed to the transformer 22. The half bridge inverter 213 presented is an example that uses LCC resonance (e.g. inductor L2 and capacitors C2 and C3) to generate the converted AC signal. The feedback signal ($V_{fb}$ from FIG. 2), is supplied to the half bridge inverter 213 in the form, for example, of the signal Vad, which is transferred to the switching arrangement by an opto-isolator (not shown in FIG. 3) to isolate the circuitry. The adjustable control signal Vad is used to control the operation frequency of the half bridge inverter by means of control signals HGO and LGO by means of a voltage controlled oscillator (VCO) which is integrated into the driving integrated circuit of the half bridge inverter.

Figure 4:
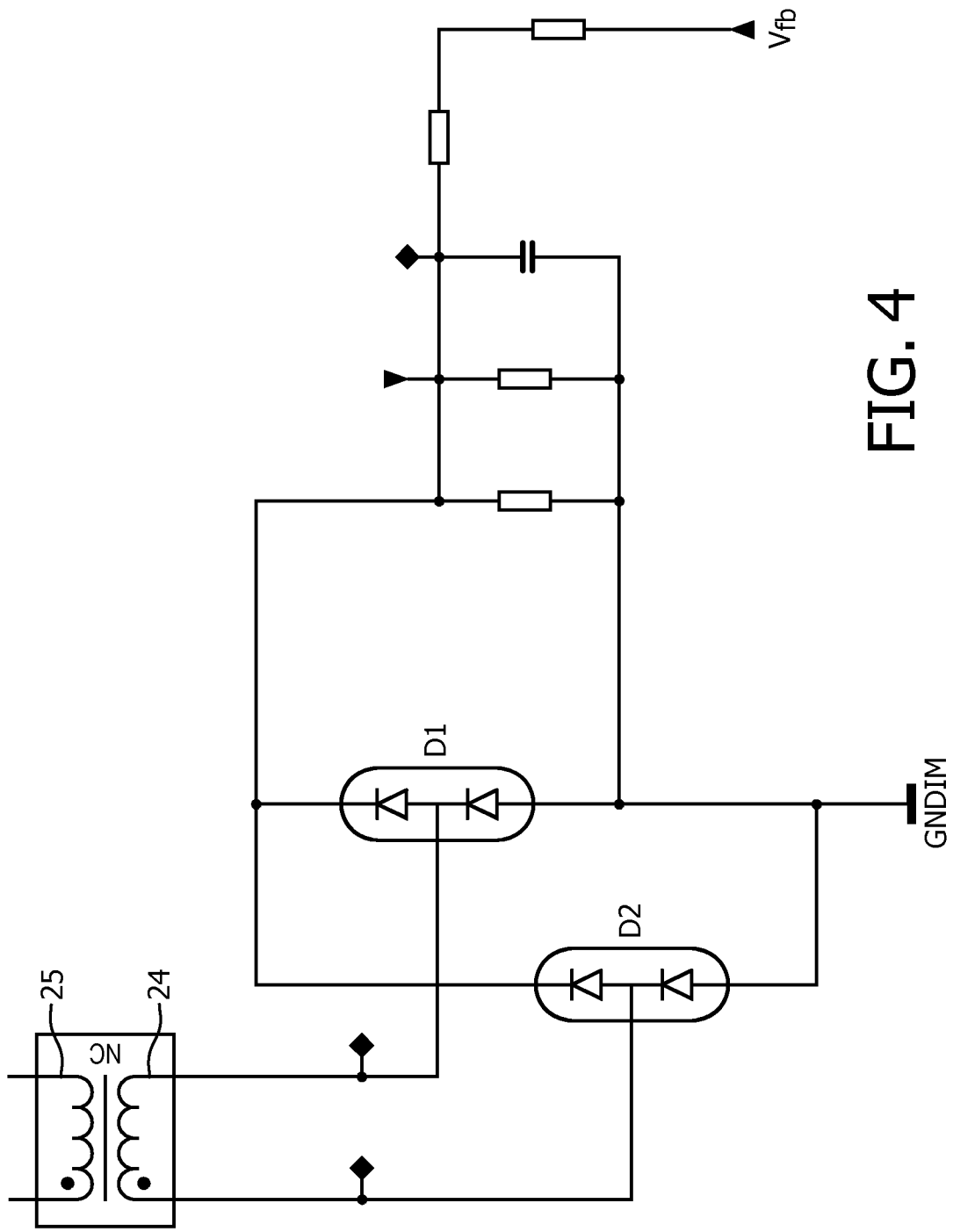
FIG. 4 displays an arrangement of feedback circuitry for a controllable driver according to the second embodiment.

FIG. 4 displays an arrangement of circuitry capable of generating the feedback signal $V_{fb}$ according to the second embodiment. The said circuitry comprises the transformer that comprises the third 24 and fourth 25 windings of the second embodiment. The fourth winding 25 is electrically connected, such as in series connection, to the second winding 222 of the first transformer (not shown in FIG. 4 but shown in FIG. 3). Current is made to flow in the fourth winding 25 in response to an induced current in the second winding (not shown); thereby causing a feedback signal to flow in the third winding 24. As this signal is in the AC domain, a bridge diode configuration comprising two diode-pairs arrangements D1, D2 is used to rectify said AC signal to produce the feedback voltage signal, after some signal filtering. The feedback voltage $V_{fb}$ signal therefore proportionally corresponds to the current flowing in the second winding 224 of the controllable driver and hence the voltage supplied to the load.

Figure 5:
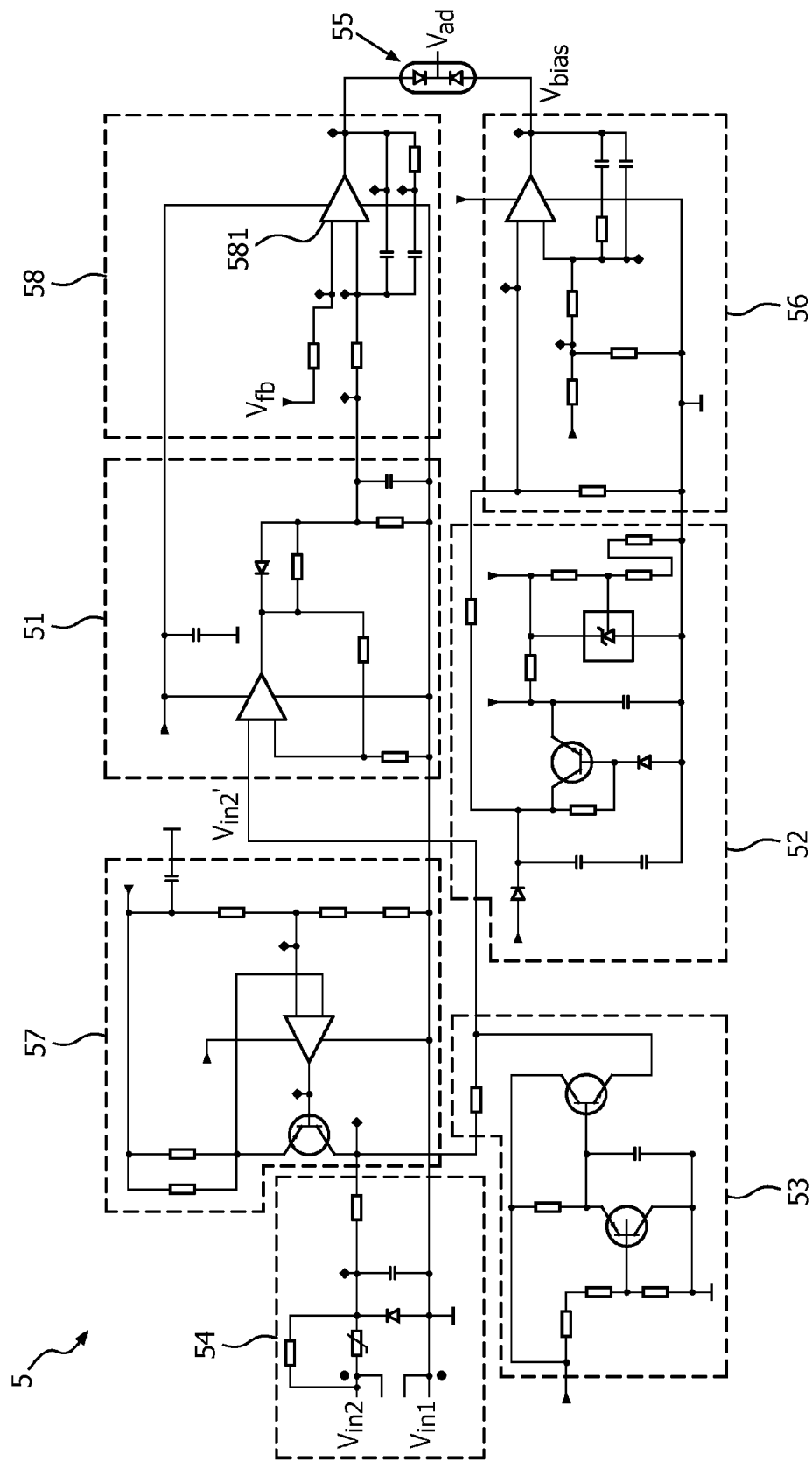
FIG. 5 depicts an exemplary control circuit for a controllable driver according to the second embodiment.
Figure 6:
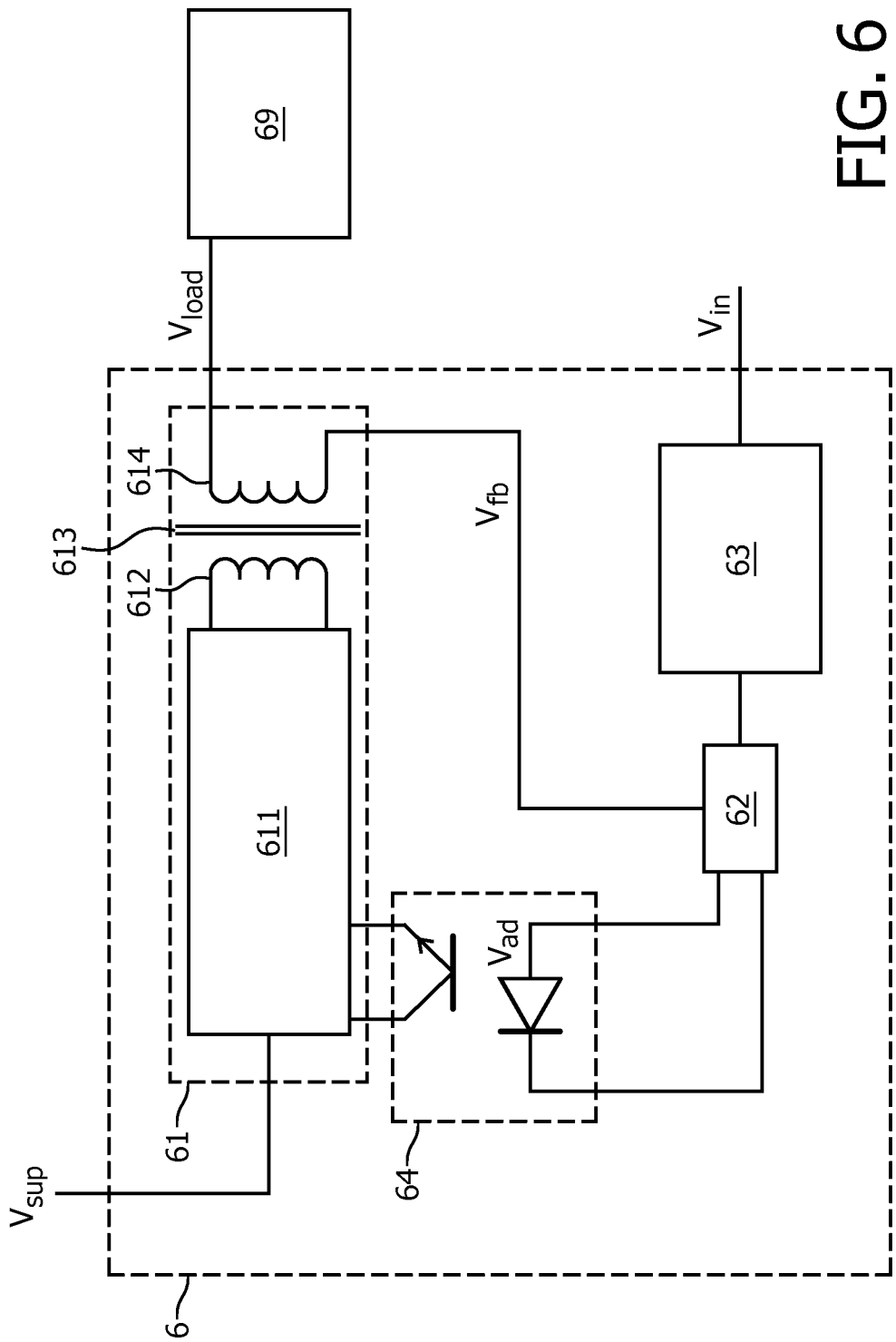
FIG. 6 depicts a prior art controllable driver with its control circuitry.

FIG. 5 illustrates an exemplary control circuit 5 for use as a control circuit 26 in the second embodiment. Control circuit 5 comprises a linear amplifier 51, low voltage supply circuitry 52, lower limit circuitry 53, a 1-10V dimming interface 54, over voltage protection circuit 56, upper limit circuitry 57, and comparator circuitry 58.

The dimming interface 54 receives a first ($V_{in1}$) and second ($V_{in2}$) voltage input control signal to pass to the linear amplifier 51, thereby generating a desired signal for comparison with the feedback signal. In this exemplary control circuit, the input control signals may each comprise a voltage signal variable between 1 and 10V, intended to control the signal supplied to the output proportionally. In a specific example, the first input $V_{in1}$ is the ground, and the second input $V_{in2}$ is the signal line with the 1-10V voltage with respect to the ground. To limit the input control signals, and hence the desired signal, to a maximum and minimum allowable voltage magnitude, the second input $V_{in2}$ is subject to upper limit circuitry 51 and lower limit circuitry 53 to generate a limited control signal $V_{in2}'$. The comparator circuitry 58 receives the limited control signal $V_{in2}'$ and the feedback signal $V_{fb}$ from the arrangement of feedback circuitry embodied in FIG. 4. A comparison is performed between the limited control signal and the feedback signal by at least one operation amplifier 581 to generate the adjustment signal $V_{ad}$. $V_{ad}$ is passed through to the opto-isolator via a pair of diodes 55.

To bias the adjustment signal to be of suitable magnitude for transmission using the said opto-isolator (not shown), low voltage supply circuitry 52 generates a biasing voltage $V_{bias}$. Over voltage protection is applied to the said biasing voltage by over voltage protection circuit 56, to prevent excessive loading of the diodes or the adjustment signal.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A controllable driver for driving a load, comprising:
   a primary converter, adapted to receive an input supply (Vsup) and an adjustment signal (Vad), and to generate a converted input supply (Vload), said primary converter comprising a first and second magnetically coupled windings, wherein the first winding and the second winding are adapted to deliver the converted input supply to a load;
   a third winding isolated from the first and second windings, wherein a feedback signal (Vfb) is induced by the converted input supply to the third winding, said feedback signal (Vfb) being indicative of a load current flowing in the second winding;
   a control circuit connected to the third winding, wherein said control circuit is adapted: to receive the feedback signal (Vfb) from the third winding; to receive at least one input control signal (Vin); and to generate the adjustment signal (Vad) based on the feedback signal (Vfb) and one or more of the at least one input control signals; and
   an opto-isolator, connected between a switching core of the primary converter and the control circuit, wherein said opto-isolator is adapted to pass the adjustment signal from the control circuit to the primary converter.

2. The controllable driver as claimed in claim 1, wherein the converter comprises:
   a power factor correction unit for correcting the power factor of the input supply, thereby generating a corrected input supply;
   a half bridge for inverting the corrected input supply into an AC wave; and
   a transformer for delivering said corrected input supply in AC wave to the load, comprising the first winding and the second winding;
   and the control circuit is adapted to receive at least one input control signal (Vin) directly via hardwire.

3. The controllable driver as claimed in claim 1, wherein the converter comprises:
   a power factor correction unit for correcting the power factor of the input supply, wherein said power factor correction unit comprises the first winding and the second winding and
   the switching core adapted to switch a power flow from the voltage supply into said first winding;
   and the control circuit comprises:
   a linear amplifier through which the input control signal is adapted to pass so as to generate a desired signal;
   a comparator circuitry adapted to perform a comparison between the desired signal and the feedback signal to generate the adjustment signal ($V_{ad}$).

4. The controllable driver as claimed in claim 1, wherein the third winding is magnetically coupled to one of the first winding or the second winding.

5. The controllable driver as claimed in claim 1, further comprising a fourth winding electrically connected to the second winding, and the third winding is magnetically coupled to the fourth winding.

6. The controllable driver as claimed in claim 1, wherein the control circuit comprises at least one of the following:
- a PWM dimming interface adapted to receive one or more of the at least one input control signal in a form of pulse-width modulated signals;
- a 1-10V dimming interface adapted to receive one or more of the at least one input control signal in a form of voltage levels variable between 1-10V; and
- a current source dimming interface adapted for measuring a resistance of an external resistor.

7. The controllable driver as claimed in claim 1, wherein the control circuit further comprises:
- a PWM dimming interface adapted to receive one or more of the at least one input control signals in a form of pulse-width modulated signals;
- a 1-10V dimming interface adapted to receive one or more of the at least one input control signals in a form of voltage levels variable between 1-10;
- a current source dimming interface adapted for measuring a resistance of an external resistor;
- a common reference line ($V_{in1}$) connected to the PWM dimming interface, the 1-10V dimming interface and the current source dimming interface; and
- one of the following:
  - a first common signal line ($V_{in2}$) connected to the PWM dimming interface, the 1-10V dimming interface and the current source dimming interface;
  - a first common signal line ($V_{in2}$) connected to the PWM dimming interface and the current source dimming interface, and a second common signal line ($V_{in3}$) connected to the 1-10V dimming interface; or
  - a first common signal line ($V_{in2}$) connected to the PWM dimming interface and a second common signal line ($V_{in3}$) connected to the 1-10V dimming interface and the current source interface.

8. The controllable driver as claimed in claim 7, further comprising a fifth winding coupled to the first winding, wherein said fifth winding is connected to the dimming interfaces and is adapted to draw a first voltage supply from said first winding to the dimming interfaces.

9. The controllable driver as claimed in claim 8, wherein the control circuit further comprises:
- an output line ($V_{out}$) coupled to the fifth winding and adapted to provide the first voltage supply as a PWM voltage reference output for connection to an external PWM controller.

10. The controllable driver as claimed in claim 9, wherein the control circuit further comprises:
- a secondary voltage supply unit connected to the fifth winding, adapted to generate a second voltage supply; and
- an output line ($V_{OUT}$) connected to the secondary voltage supply unit and adapted to provide the second voltage supply as a PWM voltage reference output for connection to an external PWM controller.

11. The controllable driver as claimed in claim 1, further comprising at least two ground terminals, wherein each ground terminal is for connection with a single, different, one of the following: the primary converter; the control circuit; and the output load.

12. A lighting device comprising the controllable driver as claimed in claim 1.

13. A drive method for driving an LED output load, the method comprising:
- receiving an input supply and an adjustment signal (Vad) at a primary converter, and generating a converted input supply (Vload);
- receiving the converted input supply of the primary converter at a first winding and providing a signal to an output load from a second winding coupled magnetically to the first winding;
- using a third winding such that a load current flowing in either the first or second winding induces a corresponding feedback signal in the third winding wherein the third winding is isolated from the first and second windings;
- receiving the feedback signal from the third winding at a control circuit, and receiving at least one input control signals, wherein said control circuit generates the adjustment signal (Vad) based on the feedback signal and the at least one input control signals; and
- passing the adjustment signal (Vad) from the control circuit to a switching core of the primary converter using an optical isolating coupling.

14. The method as claimed in claim 13, wherein receiving at least one input control signal (Vin) directly via hardwire;
and the method further comprising:
- using a fourth winding electrically connected to the second winding, and magnetically coupled to one of the first or second windings, such that a load current following in either the first or second winding causes a current to flow in the fourth winding and thereby induces a corresponding feedback signal in the third winding.

15. The method as claimed in claim 14, further comprising passing a first voltage supply to the control circuit using a fifth winding magnetically coupled to the first winding.

* * * * *